United States Patent [19]

Wall

[11] Patent Number: 4,690,570
[45] Date of Patent: Sep. 1, 1987

[54] C-SHAPED FAILURE DETECTOR FOR STEAM TRAPS

[76] Inventor: Donald W. Wall, 6850 Washington St. N.E., Minneapolis, Minn. 55432

[21] Appl. No.: 864,312

[22] Filed: May 19, 1986

[51] Int. Cl.[4] ............................................. G01K 05/70
[52] U.S. Cl. ................................... 374/188; 340/584; 340/594; 340/603; 374/205
[58] Field of Search ............... 374/205, 188; 116/221, 116/327; 340/605, 603

[56] References Cited

U.S. PATENT DOCUMENTS

| | | | |
|---|---|---|---|
| 527,034 | 10/1894 | Weston | 116/332 X |
| 2,641,800 | 6/1953 | Myers | 116/327 X |
| 3,214,278 | 10/1965 | Mylo | 116/221 |
| 3,924,468 | 12/1975 | Persson | 116/221 X |
| 4,169,381 | 10/1979 | Skopil | 374/205 |
| 4,369,728 | 1/1983 | Nelson | 73/709 X |
| 4,575,258 | 3/1986 | Wall | 374/205 X |

*Primary Examiner*—Daniel M. Yasich
*Attorney, Agent, or Firm*—Orrin M. Haugen; Thomas J. Nikolai; Frederick W. Niebuhr

[57] ABSTRACT

A C-shaped failure detector for steam traps includes a curved temperature sensitive bi-metal strip positionable against the external surface of a steam or condensate pipe, and two thermally insulative arms, one extending from each end of the strip. The contiguous surface area between the bi-metal strip and pipe varies with the pipe surface temperature, resulting in an amplified response, both in expansion and contraction. A threaded rod is pivotally mounted to one of the arms, and a sleeve threadedly engages the free end of the rod and extends freely through an opening in the other arm. The sleeve is rotated on the rod to selectively position the sleeve with respect to the second arm. The arms move angularly toward or away from each other responsive to temperature changes in the bi-metal strip. The resulting relative movement of the sleeve and second arm, visually displayed by markings on the sleeve, indicates the temperature deviation from a select bi-metal strip temperature corresponding to the select position of the sleeve.

17 Claims, 7 Drawing Figures

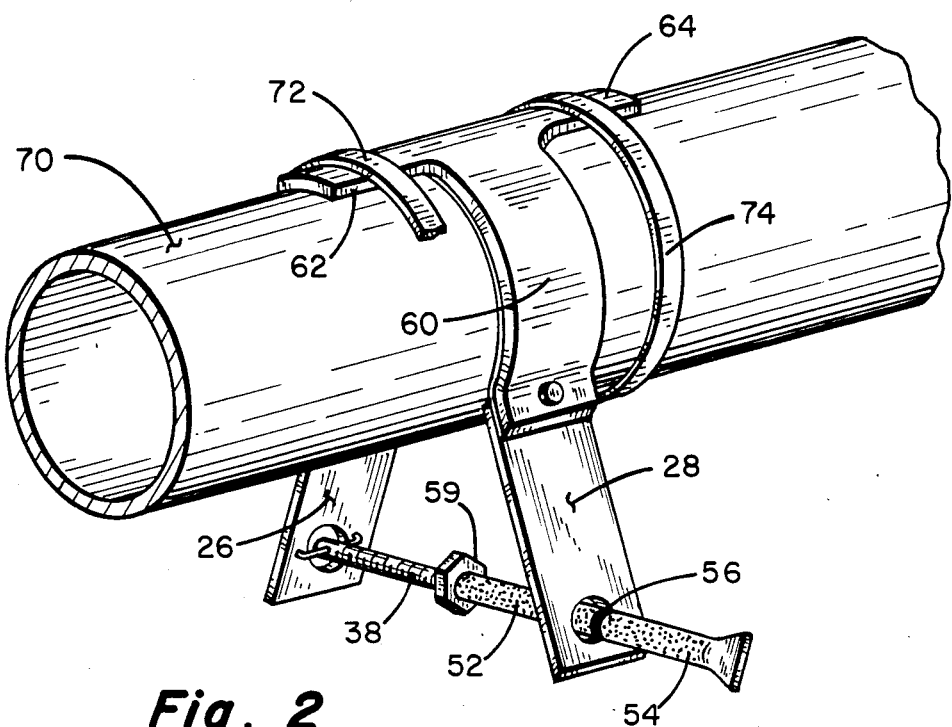
Fig. 2
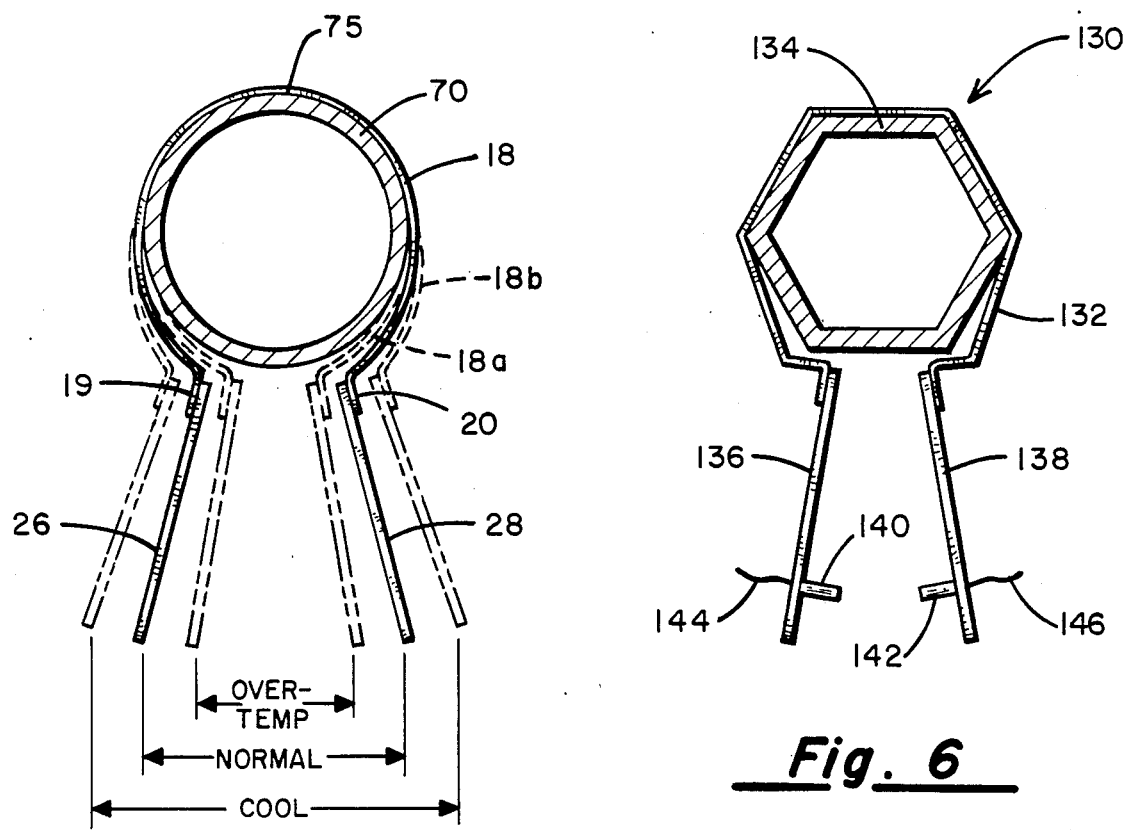
Fig. 3
Fig. 6

C-SHAPED FAILURE DETECTOR FOR STEAM TRAPS

BACKGROUND OF THE INVENTION

The present invention relates to temperature sensing and indicating apparatus, and more particularly to devices for indicating deviations from a predetermined, normal temperature at a steam trap or other device designed to operate at a substantially constant temperature. Such devices can employ temperature responsive means, for example bimetallic elements, to continually and substantially instantaneously respond to changes in temperature.

A typical steam trap is a pipe coupled automatic valve that permits condensate (condensed steam) to pass, but is a barrier to steam in vapor form. Failure of a steam trap in its open position causes substantial waste of energy, undue pressurization and excessively high temperature in condensate systems, reducing efficiency. Failure with the steam trap closed, due to mechanical failure or accumulation of dirt, scale or other residue, prevents efficient heat transfer and can result in the formation of carbonic acid, which can corrode the steam system. Failure also can occur at a position intermediate the open and closed positions.

In any event, a defective steam trap can be detected by monitoring temperatures at selected locations during system operation. In particular, temperature sensitive devices operative over ranges encountered in the steam system can be place at the steam trap inlet and outlet, and their indications of temperature observed.

A variety of temperature sensing approaches are known, including contact stethoscope devices, chemical sensors which undergo visual changes responsive to temperature, pyrometric measuring devices, infrared emission detecting devices, pressure gauges, surface thermometers, and even the intermittent opening or venting to the atmosphere of valves in condensate discharge lines for direct visual inspection. Infrared emission sensors are accurate but quite expensive. Other visual devices also tend to be expensive and are subject to erroneous readings. Pyrometric and pipe surface thermometer measurements provide information that is sufficiently accurate but can be cumbersome to use.

U.S. Pat. No. 4,575,258, issued Mar. 11, 1986 to the inventor herein, discloses a curved bi-metallic strip mounted to the exterior surface of a steam pipe, and having a free end on which is mounted a rotatable dial. A rod attached at one end to the bi-metallic strip and at the other end to the dial, rotates the dial in response to flexure of the bi-metallic strip as it experiences changes in temperature. While this device clearly indicates temperature deviations, and at relatively low cost, there has remained the need for a simpler, less costly and more reliable steam trap failure indicator, and for an indicator capable of retaining the indication of a maximum temperature deviation over a selected period of time.

It therefore is an object of the present invention to provide a low-cost, reliable temperature detecting apparatus for providing a clear indication of deviations from a standard or normal temperature, and which can be employed with typically encountered pipe surfaces in steam systems.

It is another object of the invention to provide a failure detection apparatus including a thermally sensitive strip which substantially conforms to the surface of the structure being monitored.

Yet another object of the invention is to provide an apparatus that indicates temperature deviations based principally upon linear movement of an indexing member.

It is another object of the invention to provide an apparatus for relatively permanently indicating the maximum deviation from a standard temperature over a selected time period.

SUMMARY OF THE INVENTION

To achieve these and other objects, there is provided an apparatus for indicating a change in temperature at the surface of a monitored structure. The apparatus includes a thermally sensitive element generally conforming to the surface of a structure and having a normal configuration at a select temperature, and a means for mounting the element against the surface. The apparatus includes a substantially rigid first arm means extended from one end of the element, and a second arm means integrally extended from the other end of the element in generally opposed relation to the first arm means, and therefore adapted to move relative to the first arm responsive to a thermally induced flexure of the element. An indexing member is mounted to the first arm means, moves with the first arm means, and is supported at a select location, relative to the second arm means, corresponding to the normal configuration of the strip. The index member moves away from the select location responsive to the temperature induced flexure of the element. An indexing means indicates the deviation of the indexing member from the select location, and thus indicates the difference in element temperature from the select temperature.

Ordinarily the monitored structure is a cylindrical pipe section. The thermally responsive element then preferably is a C-shaped bi-metallic strip substantially surrounding the pipe or structure, in near frictional engagement. The arm means preferably are elongate, thermally insulative arms extended generally radially outward from the structure, one arm attached to each end of the bi-metallic strip.

The indexing member can be pivotally secured to the first arm and extended through an opening in the second arm, and including an externally threaded pivotally mounted rod and an internally threaded sleeve threadedly engaged with the rod and extended through the opening. The sleeve can be adjustably positioned via indexing means thereon with respect to the first arm.

The indexing member can be provided with a ratchet means for permitting the member to move with respect to the second arm in one direction, and for preventing such movement in the opposite direction, thus to indicate the maximum deviation of the indexing member, in the one direction from the select location, over a selected time period. In its simplest form, a single bi-metal ring indexes and locks to itself, thus indicating maximum deviation in one direction.

One preferred form of indexing means includes at least two distinct exterior surface treatments applied to the indexing member to form at least two visually distinct zones. The boundary between the two zones preferably is aligned with the second arm when the strip is in its normal configuration. A variety of surface treatments are contemplated as appropriate for specific applications.

A steam trap failure detector constructed in accordance with the present invention has a minimum number of parts, and is therefore inexpensive and reliable. The arms move angularly in response to temperature changes in the bi-metallic strip. Thus, movement of the indexing member, for a given temperature deviation, can be increased by positioning the member near the radially outward ends of the arms, and by increasing the arm length. With the indexing member comprised of the threaded rod and sleeve, the sleeve location corresponding to the standard temperature may be adjusted, resulting in a failure indicator adaptable to a wide range of standard temperature settings.

IN THE DRAWINGS

The above and other features and advantages are more readily appreciated when considering the following detailed description in view of the drawings in which:

FIG. 2 is a perspective view of the assembled failure detector mounted to a typical steam or condensate pipe section;

FIG. 3 is a schematic view illustrating temperature-responsive flexure of the failure detector;

FIG. 6 shows a third embodiment of a steam trap failure detector in accordance with the present invention, modified for use with a non-cylindrical pipe section.

DETAILED DESCRIPTION OF THE PREFERRED EMBODIMENT

Figure 1:
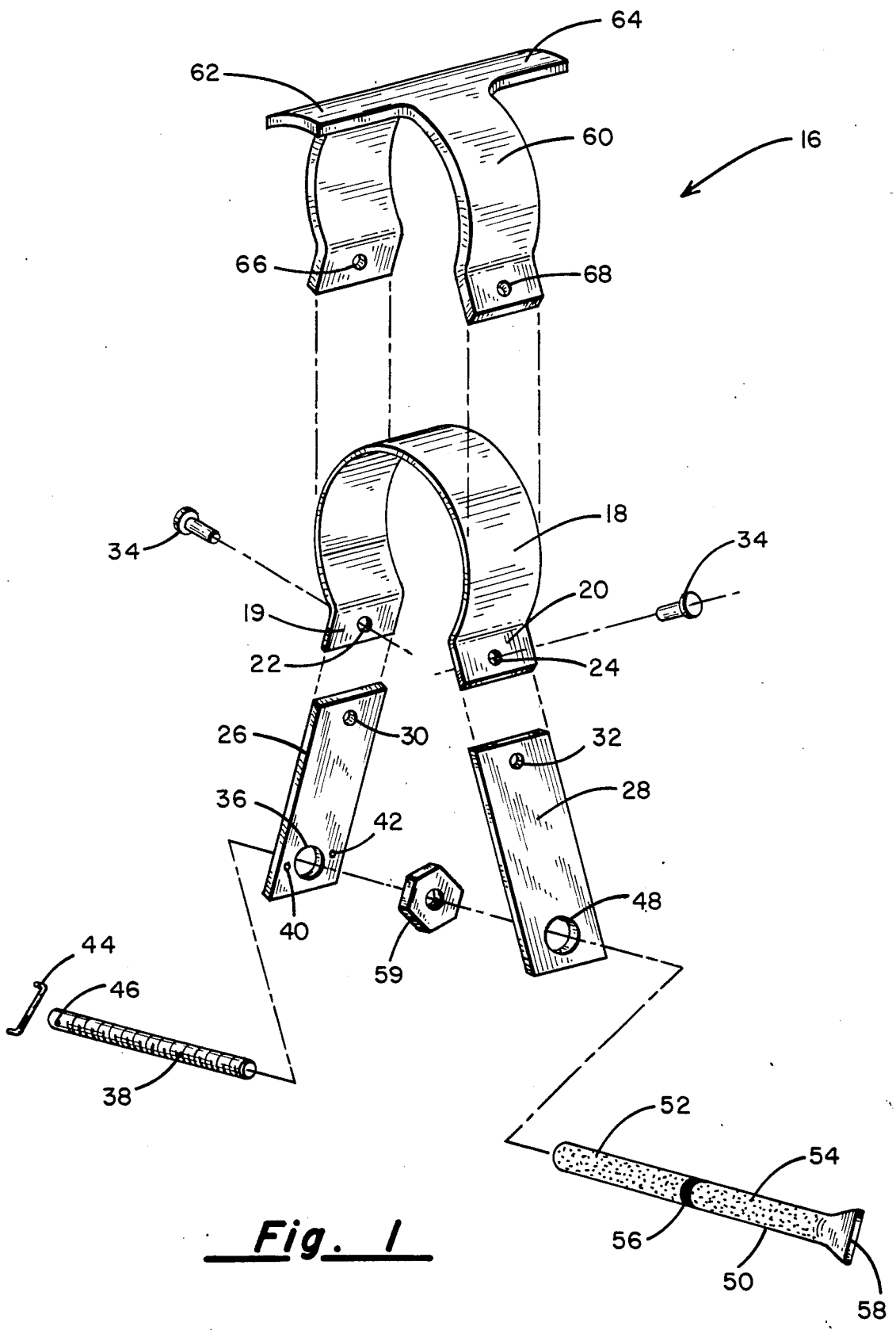
FIG. 1 is an exploded assembly view of a steam trap failure detector constructed in accordance with the present invention.

Turning now to the drawings, there is shown in FIG. 1 a steam trap failure detector 16 in exploded view. Failure detector 16 includes a flexible, C-shaped bi-metal strip 18 having first and second end portions 19 and 20 formed by bends at the opposite ends of the strip. First and second strip openings 22 and 24 are formed in the first and second end portions, respectively.

Below bi-metal strip 18 are first and second flat, elongate and substantially rigid arms 26 and 28. The arms preferably are constructed of a heat resistant, thermally insulative material such as an epoxy resin filled with glass fiber. First and second upper openings 30 and 32, near the top of first arm 26 and second arm 28, respectively, are equal in diameter to strip openings 22 and 24. Two fasteners 34 are provided, one insertable through each pair of registered upper and strip openings to fasten the arms to bi-metal strip 18. Near the bottom of first arm 26 is a first lower opening 36 which is sufficiently large to freely accommodate an externally threaded rod 38. A pair of smaller apertures 40 and 42 are formed in arm 26 near lower opening 36, one on each side.

A hinge pin 44 is bent at its opposite ends after insertion into a hinge opening 46, following which the bent ends are inserted through apertures 40 and 42. Then, the extremities of the bent portions are folded over to contain the hinge pin on the arm, thus to mount rod 38 pivotally with respect to first arm 26 about an axis transverse to the arm or horizontal as viewed in FIG. 1.

Near the bottom of second arm 28 is a second lower opening 48 which freely accommodates a sleeve 50. Sleeve 50 is threaded internally, to permit threaded engagement with rod 38. The external surface of sleeve 50 is variably treated to define first and second zones 52 and 54, and a ring or boundary 56 between the zones. Preferably, red coloring is applied to first zone 52 to indicate a deviation above the standard operating temperature, a blue coloring to second zone 54 to indicate a downward deviation, and a white coloration to ring 56. Thus, rod 38 and sleeve 50 together form an indexing member pivoted to the first arm. The rightward end portion 58 of sleeve 50 is flattened to a width exceeding the diameter of lower opening 48 to secure the sleeve in the opening once the failure detector is assembled. A locking nut 59 is provided to threadedly engage the rod to secure the position of the sleeve.

Directly above bi-metal strip 18 in FIG. 1 is a thermally insulative jacket 60 having a shape that conforms substantially to the shape of the bi-metal strip, and flexible enough to continually conform to the strip configuration, as it changes in response to variations in the strip temperature. First and second tabs 62 and 64 extend from the top of jackets 60 in opposite directions. First and second jacket openings 66 and 68 are formed in opposite ends of the jacket.

To assemble failure detector 16, one of fasteners 34 is inserted through each set of three registered openings: first jacket opening 66, first strip opening 22 and first upper opening 30 in the case of one fastener; and the corresponding three openings in the case of the other, thus to secure arms 26 and 28, along with jacket 60, to bi-metal strip 18. With rod 38 pivotally secured to first arm 26 as previously explained and remote from the second arm, strip 18 and jacket 60 are forced downward upon a pipe section 70, thus temporarily elastically deforming them until strip 18 substantially surronds pipe section 70 in wrapping engagement. Sleeve 50 then is inserted through second lower opening 48 and threaded onto rod 38. With the surface of pipe section 70 at a selected temperature, preferably at or near standard operating temperature, sleeve 50 is threadly adjusted until ring 56 is aligned with second arm 28 as illustrated in FIG. 2. Locking nut 59 then is turned against sleeve 50 to secure it at the adjusted position.

Bi-metal strip 18 is shaped to conform to the surface of pipe section 70, and different lengths of bi-metal strips can be provided to accommodate different pipe sizes. Jacket 60, or an insulative coating in lieu of the jacket, preferably covers all sides of strip 18 except the side facing pipe section 70. The jacket or coating substantially eliminates the influence on strip 18 from the ambient temperature, a particular advantage in outdoor applications.

When failure detector 16 is mounted to a horizontal pipe, there may be no need for a retainer. However, for retained mounting to a nonhorizontal pipe, or wherever desired, first and second fastening strips 72 and 74 secure tabs 62 and 64, respectively, to pipe section 70. Alternatively, springs such as those taught in U.S. Pat. No. 4,575,258 can secure the tabs. Through the use of such strips or springs, bi-metal strip 18 can be secured to a pipe, yet make only point or line contact with the pipe surface, permitting maximum response of the bi-metal strip to temperature changes.

The amount of temperature response in bi-metal strip 18 is a function of the metals selected and strip thickness. Thus, a bi-metal strip can be constructed to operate over a narrow temperature range, or one from below 0° F. to approximately 100° F., the effective upper limit of currently available bi-metallic sensors. The principal concern in detecting steam trap failure is not the precise temperature, but deviation from the standard operating temperature. The indexing member formed by rod 38 and sleeve 50 indicates, almost instantaneously, such deviation and its direction. While the indexing member, particularly sleeve 50, may be calibrated to indicate exact temperatures, failure detector 16 can function satisfactorily simply with the separate zones identified with different colors or markings as discussed above.

As seen in FIG. 3, bi-metal strip 18 can be mounted to pipe section 70 by a thermally conductive adhesive 75. Although bi-metal strip 18 substantially surrounds pipe section 70 and wrappingly engages the pipe section over a substnatial contiguous area, there is ample separation, particularly near end portions 19 and 20 of the bi-metal strip, to prevent the pipe section from interfering with expansion and contraction of the bi-metal strip in response to temperature changes. The bi-metal strip contracts as its temperature rises, assuming a configuration such as 18a when above the standard temperature, and a configuration such as 18b when below such temperature. The normal configuration, at the standard temperature, is shown at 18. As seen from comparing strip configurations 18, 18a and 18b, the continguous surface area between pipe section 70 and strip 18 increase with increasing temperature. Such increases enhances the rate of heat transfer to the strip from the pipe. Given a pipe temperature substantially above ambient temperatures—as is almost always the case—this change in heat transfer rate amplifies the strip response in both directions from the normal configuration.

Figure 4:
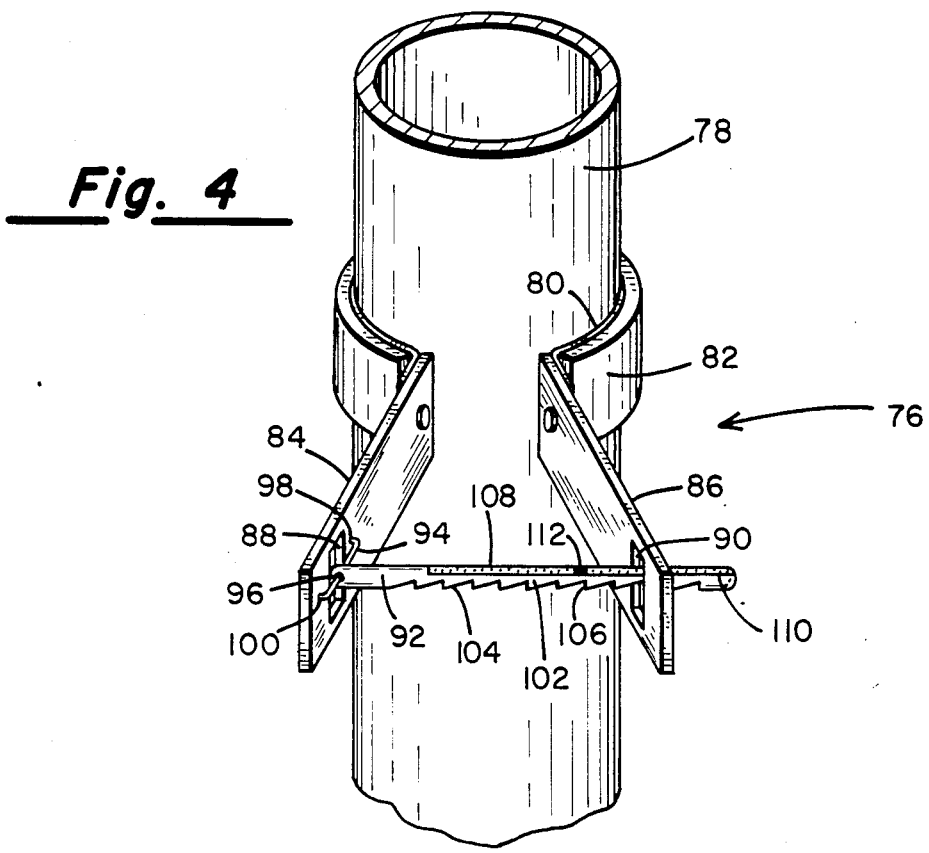
FIG. 4 is a perspective view of a second embodiment of a steam trap failure detector constructed in accordance with the present invention.

FIG. 4 illustrates a second embodiment of a steam trap failure detector 76 mounted to a vertical pipe section 78. A bi-metal strip 80 substantially surronds pipe section 78, and is covered by an insulative jacket 82. The bi-metal is held in place on the pipe section by jacket tabs as previously discussed or by small conductive adhesive at its midpoint.

First and second elongate, substantially rigid and thermally insulative arms 84 and 86 are mounted at the opposite ends of the bi-metal strip and jacket, and extend generally radially outward from pipe section 78.

Formed near the radially outward ends of arms 84 and 86 are first and second rectangular slots 88 and 90, respectively. An indexing member in the form of a unitary bar 92 is mounted to first arm 84 by a hinge pin 94 extended through a hinge opening 96 at the left end of the bar, with its two bent ends embedded in two apertures 98 and 100 on either side of slot 88. Indexing bar 92 preferably is generally rectangular in cross-section, with a serrated bottom edge including a plurality of substantially identical teeth 102, each having a relatively gradually inclined rightward edge 104 and a steep leftward edge 106. Hinge pin 94 is oriented to provide a pivot axis for bar 92 directed longitudinally of arm 84, or horizontally as viewed in FIG. 4. This permits the bar to rise and fall slightly with respect to second slot 90 in arm 86.

When a temperature change in strip 80 causes arms 84 and 86 to approach one another, bar 92 moves rightward with respect to second slot 90. Each gradually inclined edge 104 provides a ramp surface acting against the bottom of slot 90 to lift bar 92 until the associated tooth 102 emerges from the rightward end of the slot, whereupon bar 92 descends to bring the ramp surface of the succeeding tooth against the bottom edge of the slot.

By contrast, each tooth resists leftward movement of bar 92 by virtue of its steeply inclined edge 106 when just beyond the right side of second slot 90, which engages arm 86 to prevent any further movement of bar 92 relative to the arm leftward as viewed in FIG. 4.

Consequently, when bi-metal strip 80 is arranged to bring arms 84 and 86 toward one another when its temperature rises, bar 92 maintains the arms in a configuration representative of the maximum temperature in the bi-metal strip over the selected time which failure detector 76 has been permitted to operate without resetting. The maximum reading is preserved, despite any decrease in strip temperature, because the serrated edge of bar 92 prevents the arms from moving apart from one another in response of the bi-metal strip. The bar is shown to have a first zone 108, a second zone 110 and an intermediate ring 112. However, where only upward deviation is of concern, use of only zone 108, with ring 112 near the bar's right end, would suffice.

It can readily be appreciated that should it be desirable to determine the minimum strip temperature over a given time period, the orientation of teeth 102 could be reversed so that bar 92 permits only movement of arms 84 and 86 away from one another. Alternatively, the orientation of bi-metal strip 80 could be reversed such that a temperature decrease causes it to move the arms towards each other.

While hinge pin 94 determines a horizontal pivot for bar 92, it is preferable to form hinge opening 96 oversized to permit limited bar pivoting about a vertical axis as viewed in FIG. 4, to prevent any binding of the free end of bar 92 against second slot 90 due to the angular movement of arms 84 and 86 with respect to each other.

Figure 5:
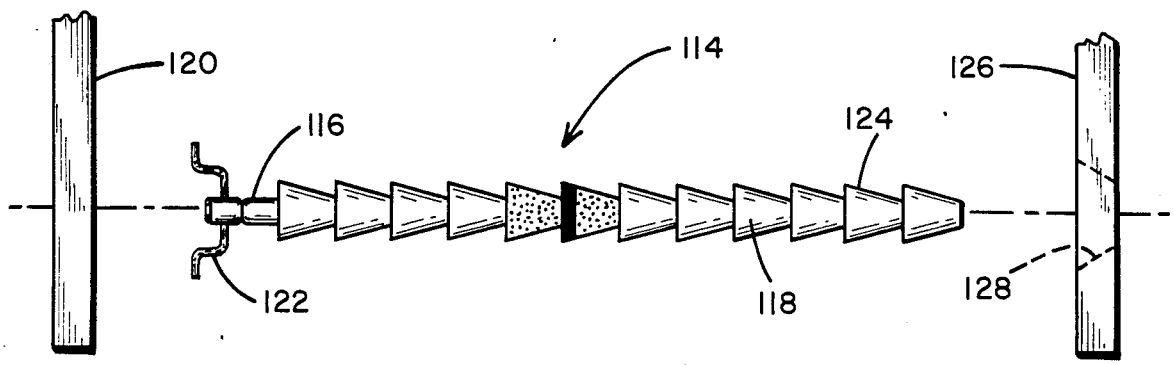
FIG. 5 is a partial front elevation showing an alternative indexing member adapted for use in connection with either embodiment of the failure detector.

FIG. 5 shows an alternative indexing member 114 which can be employed with either of failure detectors 16 and 76, and is usable in vertical, horizontal, or intermediate applications. Indexing member 114 includes an externally threaded rod 116, and an adjustable sleeve 118 having internal threads to enable its threaded engagement to rod 116. The rod is pivotally secured, in universal or all axis fashion, to a first arm 120 by a pin 122. Sleeve 118 consists of a series of concentric and substantially identical truncated cones 124, each converging toward second arm 126. An oversized opening 128 in arm 126 is sloped to generally conform to the truncated cones.

Operation of indexing member 114 is similar to that of bar 92, in that truncated cones 124 slide within opening 128 and permit movement of arms 120 and 126 toward one another. By contrast, the larger flat surface of each truncated cone 124 bears against the rightward surface of arm 126 to prevent leftward travel of the indexing member with respect to arm 126, thus to maintain the arms in their nearest proximity achieved over a selected time period, in spite of any temperature decrease in the associated bi-metal strip that otherwise would tend to separate the arms.

FIG. 6 illustrates a third embodiment of steam trap failure detector 130 in which a bi-metal strip 132 is shaped to conform to a hexagonal pipe section 134. Extended from the opposite ends of bi-metal strip 132 are first and second elongate, thermally insulative and substantially rigid arms 136 and 138. A first electrical contact 140 is mounted to arm 136, while an opposed second electrical contact 142 is mounted to arm 138. First and second wires 144 and 146 respectively link contacts 140 and 142 to electrical circuitry not shown.

Contacts 140 and 142 are separated from one another as shown at the standard temperature. As the temperature in bi-metal strip 132 increases, it contracts to move arms 136 and 138 nearer to each other until the contacts engage to complete the electric circuit. Contacts 140 and 142 perferably are preset to engage at a predetermined location of the arms, that can correspond to a strip temperature at which a warning or automatic shut-off is desirable. Analog (potentiometer) electrical outputs can also be employed. Completion of the electric circuit can trigger such warning or shut-off. Thus, one of the contacts comprises an indexing member, and the other a means for providing a non-visual indication of a predetermined unidirectional deviation of the indexing member from a select location relative to the opposite arm.

Figure 7:
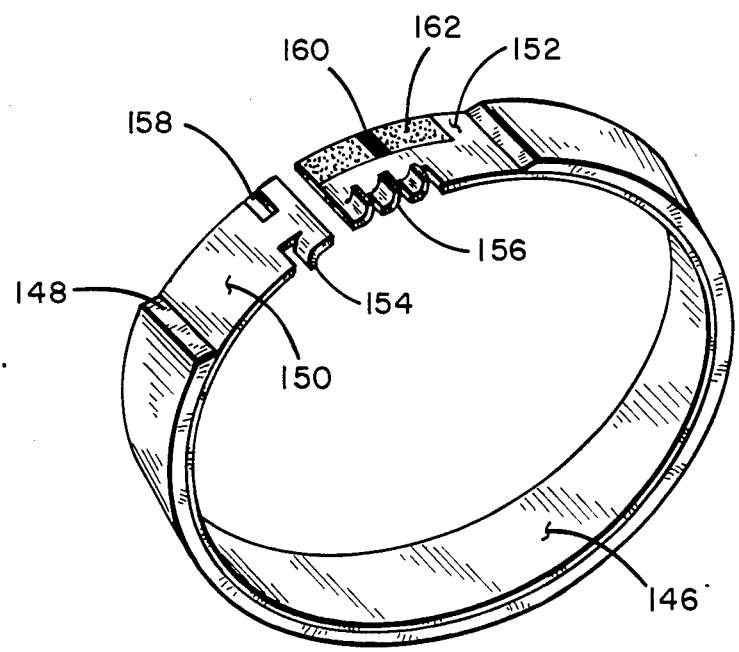
FIG. 7 is a perspective view of a one-piece, indexing, steam trap failure detector.

FIG. 7 illustrates a fourth embodiment of the steam trap failure detector. A bi-metal strip 146 surrounds the pipe section and is covered by an insulative jacket 148 except at first and second arm portions 150 and 152. A temperature rise causes arm portion 150 to be drawn toward and over arm portion 152 with a resultant decrease in ring diameter. A locking tab 154 on arm portion 150 indexes over mating tabs 156 on arm portion 152. Removal or reduction of heat causes tab 154 to become locked in the farthest of tabs 156 reached. Coded markings on the arm portions indicate the greatest temperature reached. At standard temperature, white markings 158 and 160 are aligned. A temperature increase moves white marking 158 into registration with red zone 162.

It is readily appreciated that electrical contacts 140 and 142 could be employed in connection with the C-shaped failure detectors 16 and 76, and further that sleeves 50 and 118 can be interchangeable, thus to increase the versatility of the failure detectors. The thermally insulative arms shield the bi-metal strip from ambient temperature influences, and provide inexpensive, reliable support for indexing member selected. By simply lengthening the arms and lengthening the indexing member, the failure detector can be made more accurate and more easily readable. The detector is adaptable to most surface temperature sensing applications. Further, because of the threaded or frictional engagement of the rod and sleeve, the indexing member may be adjusted to numerous settings for different standard operating temperatures at various locations throughout a steam/condensate or other system.

What is claimed is:

1. Apparatus for indicating a change in temperature at the surface of a monitored structure including:
   a thermally sensitive element generally conforming to the surface of a structure and having a normal configuration when at a predetermined temperature, and a means for mounting the element against said surface;
   a first arm means integrally extended from one end of said thermally sensitive element, and a second arm means integrally extended from the other end of said thermally sensitive element and positioned for movement relative to the first arm means responsive to thermally induced flexure of said element;
   an indexing member mounted to said first arm means for movement with said first arm means and positioned at a select location relative to said second arm means, corresponding to the normal configuration of said element, and movable along with said first arm means, and relative to said second arm means, away from the select location responsive to the thermally induced flexure of said element away from said normal configuration; and
   an indexing means on said indexing member and cooperating with said second arm means to indicate a deviation of said indexing member relative to said second arm means from said select location, thereby to indicate a difference in element temperature from said predetermined temperature.

2. The apparatus of claim 1 wherein:
   said thermally sensitive element is a bi-metallic strip configured for mounting in substantially surrounding relation to said structure, and said means for mounting the element comprises the frictional engagement of said element with said structure.

3. The apparatus of claim 1 including:
   a thermally insulative jacket covering the side of said element opposite to the side facing said structure.

4. The apparatus of claim 3 wherein:
   said means for mounting the element comprise opposed tabs formed in said jacket and extending away therefrom along said surface, and means for mounting said tabs against said surface.

5. The apparatus of claim 3 wherein:
   said means for mounting the element comprises a thermally conductive adhesive.

6. The apparatus of claim 1 wherein the surface of said structure is arcuate, and said strip is C-shaped.

7. The apparatus of claim 1 wherein:
   said first and second arm means comprise first and second substantially rigid, elongate, thermally insulative arms.

8. The apparatus of claim 7 wherein:
   said indexing member is pivotally secured to said first arm at one end, with its free end extended through an opening in said second arm.

9. The apparatus of claim 8 wherein:
   said indexing member includes an externally threaded rod pivotally mounted to the first arm, and an internally threaded sleeve threadedly engaged with said rod.

10. The apparatus of claim 9 including:
    a locking means for securing the position of said sleeve on said rod.

11. The apparatus of claim 9 wherein:
    said sleeve is comprised of a series of concentric and substantially identical truncated cones, all converging in one direction.

12. The apparatus of claim 8 including:
    a ratchet means on said index member for permitting its movement relative to said second arm in one direction, and for preventing such movement in the opposite direction, whereby said indexing means retains the indication of the maximum deviation of said indexing member, from the select location and in said one direction, over a selected time period.

13. The apparatus of claim 12 wherein:
    said ratchet means includes a series of substantially identical teeth along one edge of the index member, each tooth having one steeply inclined edge and one gradually inclined edge.

14. The apparatus of claim 12 wherein:

said ratchet means includes a series of concentric and substantially identical truncated cones formed in said indexing member, all cones converging in said one direction.

15. The apparatus of claim 1 wherein:

said indexing means includes at least two distinct exterior surface treatments applied to said indexing member to form at least two visually distinguishable zones, with the boundary between said zones aligned with said second arm means when the indexing member is in the select location.

16. The apparatus of claim 15 wherein:

said indexing means comprises coatings of three different colors applied to the indexing member, one of said coatings applied to form a comparatively narrow boundary region between the remaining two coatings and aligned with said second arm means when said indexing member is in the select location.

17. Apparatus for indicating a change in temperature at the surface of a monitored steam trap geometrically shaped structure including:

a thermally sensitive element generally conforming to the surface of a structure and having a normal configuration when at a select element temperature, and means for mounting the element against said surface;

a first arm means integrally extended from one end of said element, and second arm means integrally extended from the other end of said element and positioned for movement relative to the first arm means responsive to thermally induced flexure of said element;

a first electrical contact mounted to said first arm means, and a second electrical contact mounted to said second arm means and spaced apart from said first electrical contact when said element is in said normal configuration, said first and second contacts electrically connected to a warning signal or shut off means;

said thermally induced flexure of said element, responsive to a temperature deviation of a selected amount and in a selected direction from said select element temperature, causing said first and second arm means to move toward each other a predetermined distance to cause said first and second electrical contacts to electrically engage.

* * * * *

UNITED STATES PATENT AND TRADEMARK OFFICE
CERTIFICATE OF CORRECTION

PATENT NO. : 4,690,570

DATED : September 1, 1987

INVENTOR(S) : Donald E. Wall

It is certified that error appears in the above-identified patent and that said Letters Patent is hereby corrected as shown below: Title page Item [76]:

The inventor's name "Donald W. Wall" should read -- Donald E. Wall --.

Signed and Sealed this

Twelfth Day of January, 1988

Attest:

DONALD J. QUIGG

Attesting Officer

Commissioner of Patents and Trademarks